J. S. Mackay,
Leak Stopper.
N° 31,143.   Patented Jan. 15, 1861.
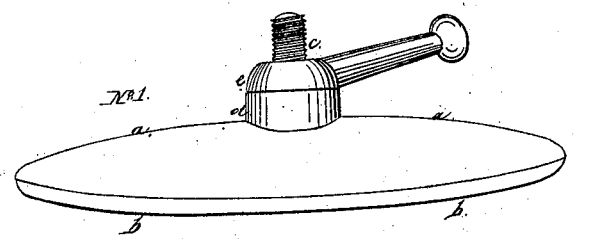
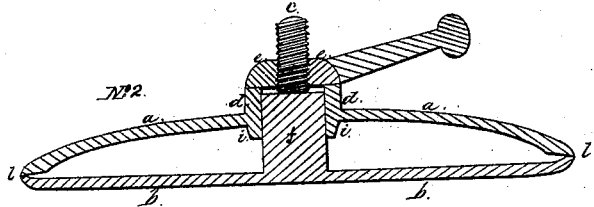
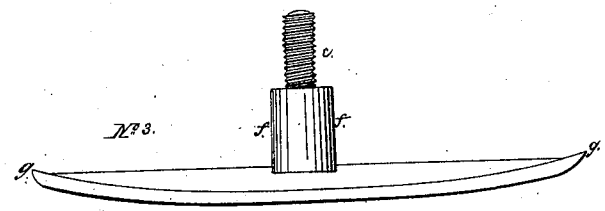
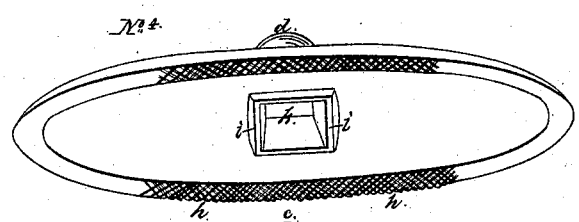
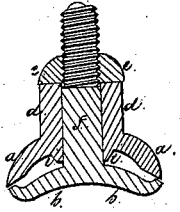
Witnesses;          Inventor;

UNITED STATES PATENT OFFICE.

JOHN S. MACKAY, OF BROOKLYN, ASSIGNOR TO HIMSELF AND HUGH MACKAY, OF NORTH CASTLE, NEW YORK.

IMPROVEMENT IN MENDING FIRE-ENGINE HOSE.

Specification forming part of Letters Patent No. 31,143, dated January 15, 1861.

*To all whom it may concern:*

Be it known that I, JOHN S. MACKAY, of the city of Brooklyn, county of Kings, and State of New York, have invented a new, useful, and effective machine for closing any rupture or break that may occur by the bursting of fire-engine hose when in active use, which admits of the immediate application to and consequently continued use of the hose during the emergency of a fire; and I do hereby declare that the following, together with the accompanying drawings, which form part of this specification, is a full and exact description.

The nature of my invention consists of a clamp formed by two plates of metal with raised edges, the plates being made of similar size and form, so that the raised edges form a joint, and to be held together with one or more screws and nut or nuts or their equivalent.

Referring to the drawings, No. 1 is a side view of the machine. No. 2 is a vertical sectional view. No. 3 is a side view of the under plate. No. 4 is a view of the under side of the upper plate. No. 5 is a vertical transverse section showing the curve of the under plate.

Corresponding letters of reference refer to corresponding parts in either plate.

Plate No. 1: $a$ is the upper plate; $b$, the under plate; $c$, the screw; $d$, the top of the shoe; $e$, the nut with an arm to add to its power and to facilitate its being turned up or down.

Plate No. 2: $f$ is a square or oblong shank, which, when one screw only is used, secures the position of one plate over the other. $d\,d$ are the projections of the shoe above, and $i\,i$ below the plates. $e$ is the nut. $c$ is the screw. $l\,l$ are the joints where the raised edges come together.

Plate No. 3 is a side view of the under plate with a screw permanently fixed in its center or elsewhere, as occasion may require. $f$ is the square or oblong shank of the screw. $g\,g$ are the raised edges.

Plate No. 4 is a view of the under side of the upper plate. $h$ is the indented surface of the raised edge. $i\,i$ is a projection of the shoe. $k$ is the oblong or square slot through which the screw passes.

To enable others skilled in the art to make and use my invention, I will proceed to describe its construction and operation.

I construct my plates in an oval form with the two surfaces that come together to be from side to side an arc of the inside circle of the hose, so that the under plate when sitting parallel and on the inside of the hose will fit the inside surface when the hose is extended by the pressure of the water.

I have one or more screws permanently fixed in my lower plate, on the lower part of which screw, when one only is used, I construct a square or oblong shank. In my upper plate I construct a shoe passing through and forming part of the upper plate, which, fitting and sliding on the shank of the screw, enables me to command the position of the lower plate and secures the two plates in their proper position when screwed down.

The upper plate is not to be taken off from the screw, and the square part of the screw is made of sufficient length to admit of the plates being separated as far as may be necessary without the shoe leaving it, thus enabling me to handle the lower plate and command its position by holding the upper plate. On the raised edge of my upper plate I have an indented surface, so as to more firmly hold the leather or other material of which hose may be constructed from slipping. I also make my upper plate concave on the under side to create a chamber to admit the lips of the hose, that may turn up around the shank of the screw in case nothing is cut out, (as might be the case where hose are made of material not easily cut,) and in case I should find in practice that my indented edge was not sufficient to hold the leather or other material of which hose may be constructed from slipping I would add to my upper plate on the inside of the raised edge, projecting teeth to fasten it more securely.

When the hose bursts, a small strip of leather should be cut out and the hole, if necessary, be extended in length to facilitate the introduction of the under plate through the hole. Then the under plate is to be introduced through the hole and remain on the inside of the hose and the upper plate adjusted over the hole and screwed down firmly onto the hose. The leather or other material thus forming a packing between the plates makes a watertight joint around the hole or break. No instrument for this purpose is known to me prior to this invention, except a leather jacket to buckle around the hose and a sliding band of metal, which may be adjusted over the break and fit the outside of the hose when extended by pressure of water.

What I claim as my invention, and desire to secure by Letters Patent, is—

Stopping rents or holes in hose and other elastic tubes or pipes, substantially as herein set forth.

J. S. MACKAY.

Witnesses:
  COON T. GODFREY,
  EDW. H. PHILLIPS,
  WALTER NICHOLS.